US011875930B2

(12) United States Patent
Hasegawa et al.

(10) Patent No.: US 11,875,930 B2
(45) Date of Patent: Jan. 16, 2024

(54) INDUCTOR COMPONENT AND METHOD OF MANUFACTURING INDUCTOR COMPONENT

(71) Applicant: Murata Manufacturing Co., Ltd., Kyoto-fu (JP)

(72) Inventors: Shin Hasegawa, Nagaokakyo (JP); Tatsuya Sasaki, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 483 days.

(21) Appl. No.: 17/025,892

(22) Filed: Sep. 18, 2020

(65) Prior Publication Data

US 2021/0090788 A1 Mar. 25, 2021

(30) Foreign Application Priority Data

Sep. 19, 2019 (JP) ................................ 2019-170631

(51) Int. Cl.

| | |
|---|---|
| ***H01F 27/29*** | (2006.01) |
| ***H01F 27/24*** | (2006.01) |
| ***H01F 37/00*** | (2006.01) |
| ***H01F 17/06*** | (2006.01) |
| ***H01F 41/08*** | (2006.01) |
| ***H01F 27/30*** | (2006.01) |

(52) U.S. Cl.

CPC ......... *H01F 27/292* (2013.01); *H01F 17/062* (2013.01); *H01F 27/24* (2013.01); *H01F 27/306* (2013.01); *H01F 37/00* (2013.01); *H01F 41/08* (2013.01)

(58) Field of Classification Search

CPC ...... H01F 27/292; H01F 17/062; H01F 27/24; H01F 27/306; H01F 37/00; H01F 41/08; H01F 27/2828; H01F 27/2895

See application file for complete search history.

(56) References Cited

U.S. PATENT DOCUMENTS 9,984,809 B2 * 5/2018 Wakamori .......... H01F 41/0246
2005/0017835 A1 * 1/2005 Oki ...................... H01F 27/292 336/65

(Continued)

FOREIGN PATENT DOCUMENTS

CN 106257603 A 12/2016
CN 106463237 A 2/2017

(Continued)

*Primary Examiner* — Mang Tin Bik Lian

(74) *Attorney, Agent, or Firm* — Studebaker & Brackett PC

(57) ABSTRACT

An inductor component includes a case; an annular core accommodated in the case; a coil wound around the core; and an electrode terminal attached to the case and connected to the coil. The electrode terminal includes a mounting surface portion that is disposed along an end surface of the core and that is to be mounted on a mount substrate, and a connection surface portion that is perpendicularly connected to the mounting surface portion and that is disposed along an outer peripheral surface of the core. The coil includes a plurality of pin members including a first linear pin member. A connection surface that is a part of an outer peripheral surface of the first linear pin member is in surface-contact with a first main surface of the connection surface portion in a state in which the connection surface is positioned parallel to the first main surface.

19 Claims, 12 Drawing Sheets

(56) References Cited

U.S. PATENT DOCUMENTS

| | | | | |
|---|---|---|---|---|
| 2011/0260821 | A1* | 10/2011 | Yamada | H01F 41/10 336/192 |
| 2016/0181007 | A1* | 6/2016 | Shiokawa | H01F 41/08 29/606 |
| 2016/0372261 | A1 | 12/2016 | Ozawa | |
| 2017/0084384 | A1 | 3/2017 | Otsubo et al. | |
| 2017/0316874 | A1* | 11/2017 | Igarashi | H01F 27/292 |
| 2018/0012699 | A1* | 1/2018 | Arimitsu | H01F 27/24 |
| 2018/0025831 | A1* | 1/2018 | Sasaki | H01F 27/29 336/221 |
| 2019/0371520 | A1* | 12/2019 | Pasko | H01F 27/24 |

FOREIGN PATENT DOCUMENTS

| | | | |
|---|---|---|---|
| JP | H05121256 | A | 5/1993 |
| JP | 2008-159964 | A | 7/2008 |
| JP | 2011-249770 | A | 12/2011 |
| JP | 2015126144 | A | 7/2015 |
| JP | 2016029678 | A | 3/2016 |
| JP | 2016134589 | A | 7/2016 |
| JP | 2016187031 | A | 10/2016 |
| WO | 2015190229 | A1 | 12/2015 |

* cited by examiner

INDUCTOR COMPONENT AND METHOD OF MANUFACTURING INDUCTOR COMPONENT

CROSS-REFERENCE TO RELATED APPLICATION

This application claims benefit of priority to Japanese Patent Application No. 2019-170631, filed Sep. 19, 2019, the entire content of which is incorporated herein by reference.

BACKGROUND

Technical Field

The present disclosure relates to an inductor component and a method of manufacturing an inductor component.

Background Art

Japanese Unexamined Patent Application Publication No. 2016-134589 describes an example of an inductor component according to the related art. The inductor component includes a magnetic core, a wire that is wound around the magnetic core, and an electrode terminal that is attached to the magnetic core. The wire is connected to the terminal electrode by winding (wrapping) the wire around the terminal electrode.

In the inductor component according to the related art, in which the wire is connected to the electrode terminal by wrapping the wire around the electrode terminal, the electrode terminal may deform due to an operation of wrapping the wire around the electrode terminal or due to residual stress that remains in the wrapped wire. In particular, if the electrode terminal is thin, the electrode terminal is easily deformed when connecting a thick wire to the thin electrode terminal by wrapping the wire. Moreover, when the wire is wrapped around the electrode terminal, swelling of the wire due to bending occurs, thus a gap may be formed between the wire and the electrode terminal, and it may not be possible to realize connection stability and reduction in size.

SUMMARY

The present disclosure provides an inductor component and a method of manufacturing an inductor component each of which allows a coil to be connected to an electrode terminal without wrapping the coil around the electrode terminal.

An inductor component according to an aspect of the present disclosure includes a case; an annular core that is accommodated in the case; a coil that is wound around the core; and an electrode terminal that is attached to the case and connected to the coil. The electrode terminal includes a mounting surface portion that is disposed along an end surface of the core and that is to be mounted on a mount substrate, and a connection surface portion that is perpendicularly connected to the mounting surface portion and that is disposed along an outer peripheral surface of the core. The coil includes a plurality of pin members including a first linear pin member. A connection surface that is a part of an outer peripheral surface of the first linear pin member is in surface-contact with a first main surface of the connection surface portion in a state in which the connection surface is positioned parallel to the first main surface.

With the aspect, the connection surface of the coil is connected to the first main surface of the connection surface portion of the electrode terminal so as to be positioned parallel to and to be in surface-contact with the first main surface, and thus the coil is not connected to the electrode terminal by wrapping the coil around the electrode terminal. Here, the term “wrapping” refers to winding the coil around the electrode terminal.

Accordingly, deformation of the electrode terminal due to the operation of wrapping the coil and residual stress in the wrapped coil can be prevented. Thus, a thick coil can be connected to a thin electrode terminal, and an electrode terminal that can be easily bent and a coil that can pass a large electric current can be used. Moreover, because the coil is not wrapped around the electrode terminal, swelling of the coil due to bending does not occur, thus a gap is not likely to be formed between the coil and the electrode terminal, and connection stability and reduction in size can be realized.

In an inductor component according to an embodiment, the electrode terminal includes a mold surface portion that is connected to the mounting surface portion and embedded in the case.

With the embodiment, the electrode terminal is embedded in the case, and the inductor component is resistant to vibration and impact load.

In an inductor component according to an embodiment, the electrode terminal includes a fillet surface portion that is perpendicularly connected to the mounting surface portion and along which solder is to creep up.

With the embodiment, when mounting the inductor component on a mount substrate by using solder, the solder can creep up the fillet surface portion, and it is possible to visually inspect solder joint after being mounted.

In an inductor component according to an embodiment, in a connection portion where the coil and the electrode terminal are connected to each other, a thickness of the coil is larger than or equal to twice a thickness of the connection surface portion.

With the embodiment, the coil can be made thicker, the coil that can pass a large electric current can be used, the electrode terminal can be made thinner, and the electrode terminal that can easily bent can be used.

In an inductor component according to an embodiment, the coil is welded to the connection surface portion of the electrode terminal.

With the embodiment, the coil is welded to the connection surface portion of the electrode terminal, and thus crack is more unlikely to occur compared with soldering or adhesive bonding, and the connection strength can be increased.

In an inductor component according to an embodiment, the coil is at least welded to an edge of the connection surface portion.

With the embodiment, the coil is welded to at least the edge of the connection surface portion, and thus not only the edge of the connection surface portion but also a part of the coil can be fused and joined to each other, and the connection strength can be increased.

In an inductor component according to an embodiment, a shortest distance between a welded portion where the coil and the electrode terminal are welded to each other and a boundary portion between the mounting surface portion and the connection surface portion is larger than or equal to twice a thickness of the connection surface portion.

With the embodiment, the shortest distance between the welded portion and the boundary portion is larger than or equal to twice the thickness of the connection surface portion, and thus transfer of heat during welding to the mounting surface portion can be reduced. Thus, in a case where the mounting surface portion is plated with tin beforehand in order to improve the wettability of solder and then the coil is welded to the connection surface portion, the influence of heat during welding on tin plating can be reduced, and the wettability of solder on the mounting surface portion can be maintained.

A method of manufacturing an inductor component according to an embodiment is a method of manufacturing a inductor component that includes an annular core, a coil that is wound around the core and includes a plurality of pin members that are connected and include a first linear pin member, and an electrode terminal including a mounting surface portion and a connection surface portion that is connected to the mounting surface portion. The method includes a step of bringing, in a state in which the mounting surface portion and the connection surface portion are developed on an identical plane, a connection surface of an outer peripheral surface of the first linear pin member into surface-contact with a first main surface of the connection surface portion and welding the connection surface to the first main surface in a state in which the connection surface is positioned parallel to the first main surface; and a step of bending the connection surface portion relative to the mounting surface portion and causing the connection surface portion to stand perpendicular to the mounting surface portion.

With the embodiment, the connection surface of the coil is connected to the first main surface of the connection surface portion of the electrode terminal so as to be positioned parallel to and to be in surface-contact with the first main surface, and thus the coil is not connected to the electrode terminal by wrapping the coil around the electrode terminal.

Accordingly, deformation of the electrode terminal due to the operation of wrapping the coil and residual stress in the wrapped coil can be prevented. Thus, a thick coil can be connected to a thin electrode terminal, and an electrode terminal that can be easily bent and a coil that can pass a large electric current can be used. Moreover, because the coil is not wrapped around the electrode terminal, swelling of the coil due to bending does not occur, thus a gap is not likely to be formed between the coil and the electrode terminal, and connection stability and reduction in size can be realized.

Moreover, after welding the pin member to the connection surface portion in a state in which the mounting surface portion and the connection surface portion are developed, the connection surface portion is bent relative to the mounting surface portion and the connection surface portion is caused to stand with respect to the mounting surface portion, and thus the welding operation can be easily performed, compared with a case where the pin member is welded to the connection surface portion in a state in which the connection surface portion has been caused to stand on the mounting surface portion.

In particular, when welding the pin member to each of a plurality of electrode terminals, the electrode terminals are arranged on an identical plane in a developed state, and the pin member can be welded to each of the electrode terminals, so that the welding operation can be performed on an identical plane and can be performed easily.

With the inductor component and the method of manufacturing an inductor component according to an aspect of the present disclosure, a coil can be connected to an electrode terminal without wrapping the coil around the electrode terminal.

Other features, elements, characteristics and advantages of the present disclosure will become more apparent from the following detailed description of preferred embodiments of the present disclosure with reference to the attached drawings.

DETAILED DESCRIPTION

Figure 1:
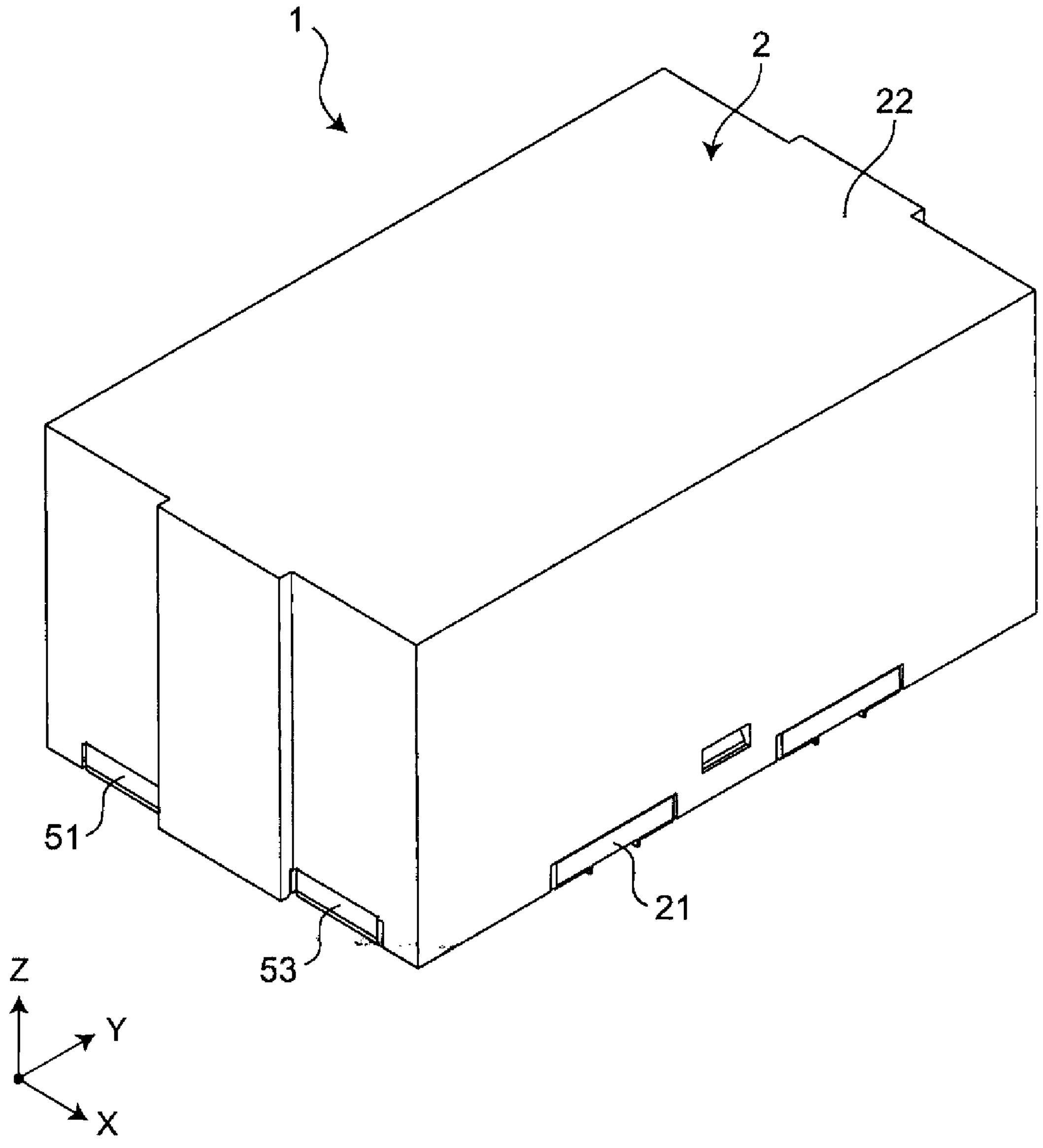
FIG. 1 is an upper perspective view of an inductor component according to an embodiment of the present disclosure.

Hereafter, inductor components according to embodiments of the present disclosure will be described in detail with reference to the drawings. The drawings include schematic views, and dimensions and proportions in the drawings may differ from actual ones.

Embodiment

Configuration of Inductor Component

Figure 2:
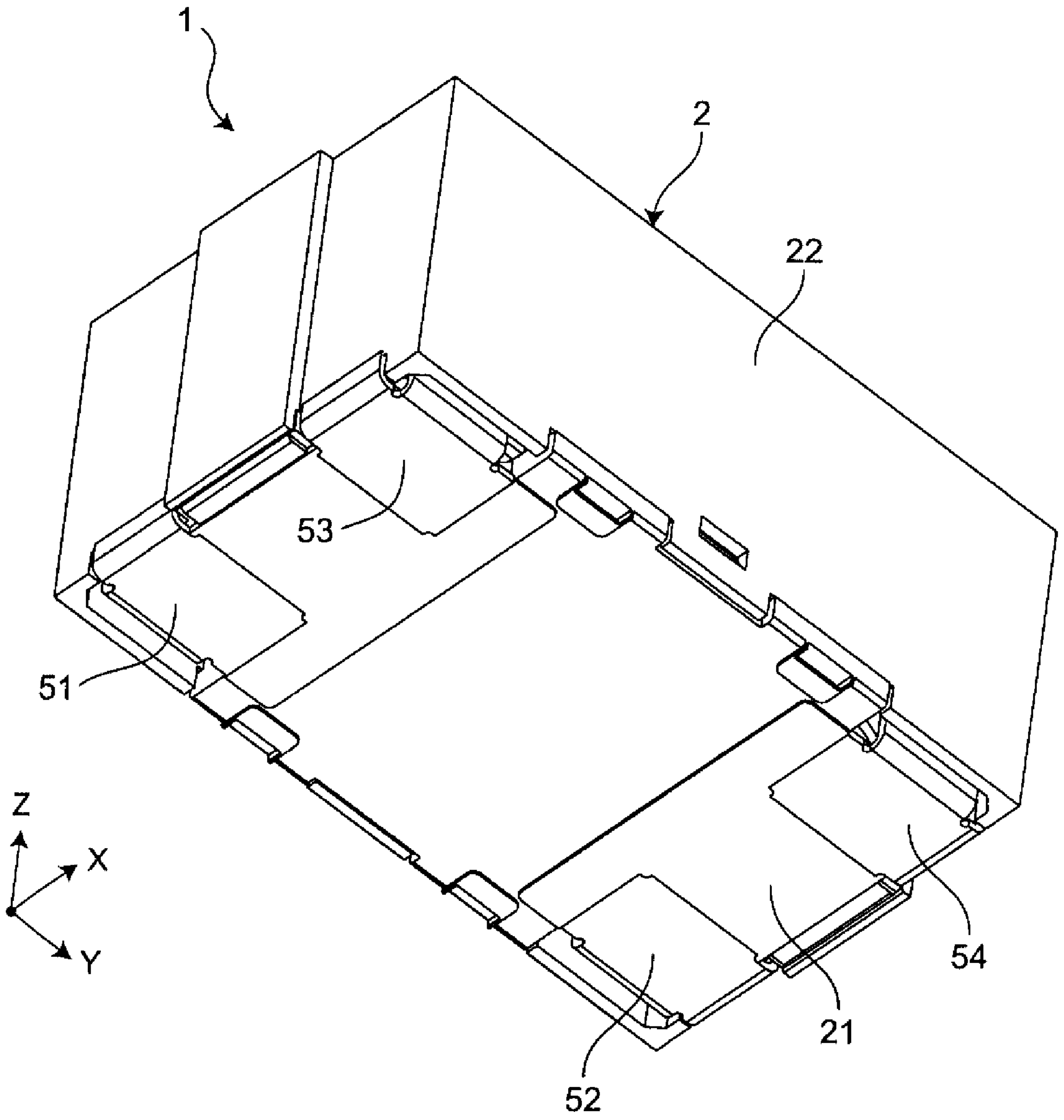
FIG. 2 is a lower perspective view of the inductor component.
Figure 3:
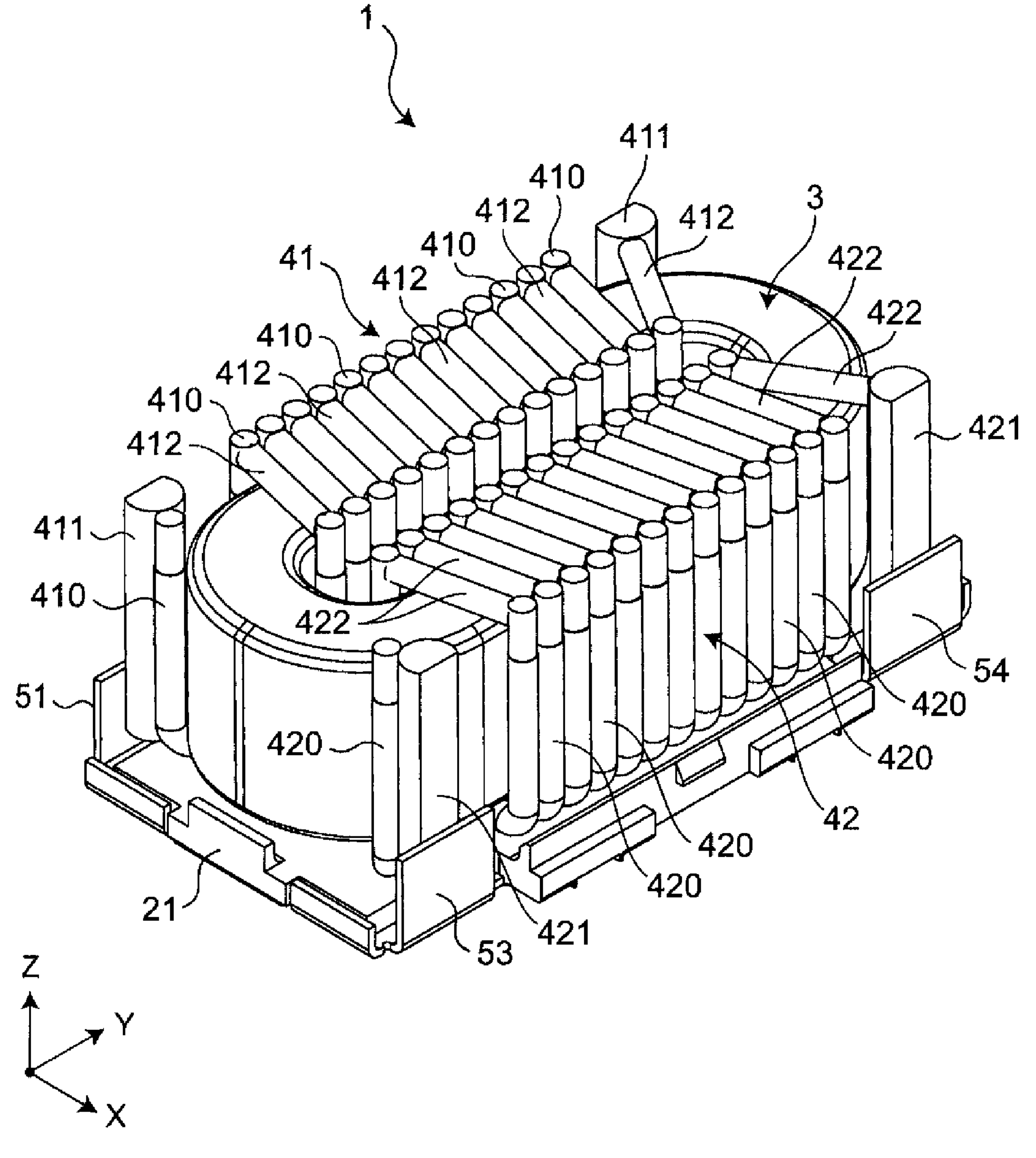
FIG. 3 is an upper perspective view illustrating the inside of the inductor component.
Figure 4:
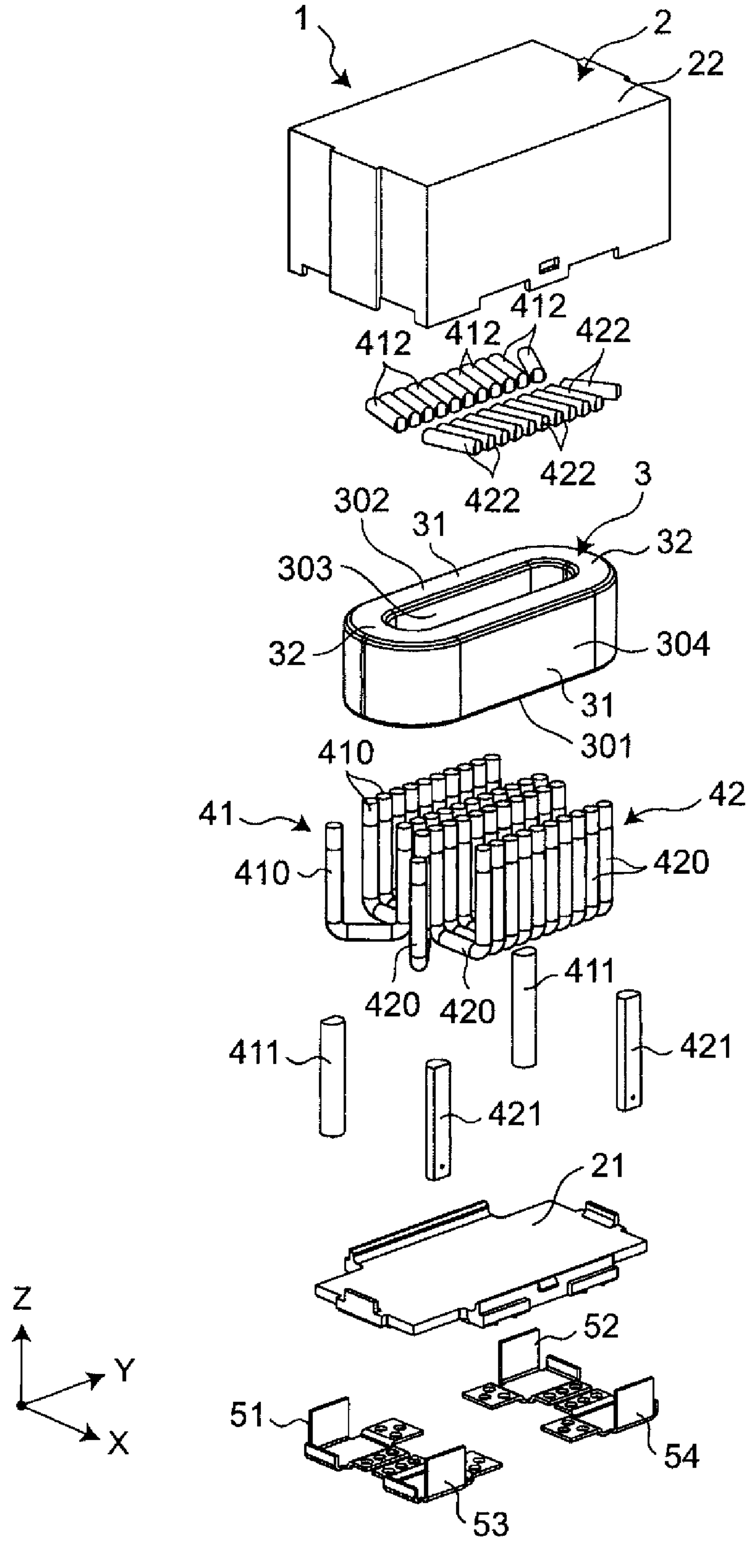
FIG. 4 is an exploded perspective view of the inductor component.

FIG. 1 is an upper perspective view of an inductor component according to an embodiment of the present disclosure. FIG. 2 is a lower perspective view of the inductor component. FIG. 3 is an upper perspective view illustrating the inside of the inductor component. FIG. 4 is an exploded perspective view of the inductor component.

As illustrated in FIGS. 1 to 4, an inductor component 1 includes a case 2, an annular core 3 that is accommodated in the case 2, a first coil 41 and a second coil 42 that are wound around the core 3 so as to face each other, and first to fourth electrode terminals 51 to 54 that are attached to the case 2 and connected to the first coil 41 and the second coil 42. The inductor component 1 is, for example, a common-mode choke coil or the like.

The case 2 includes a bottom plate portion 21 and a cover 22 that has a box-like shape and that covers the bottom plate portion 21. The case 2 is made of a material that has strength, heat resistance, and is preferably made of a fire-retardant material. For example, the case 2 is made of a resin such as polyphenylene sulfide (PPS), liquid crystal polymer (LCP), or polyphthalamide (PPA); or ceramics. The core 3 is set on the bottom plate portion 21 so that the axis of the core 3 is perpendicular to the bottom plate portion 21. The axis of the core 3 is the axis of an inner hole of the core 3. The shape of the case 2 (the bottom plate portion 21 and the cover 22) is a quadrangle when seen in the axial direction of the core 3. In the present embodiment, the shape of the case 2 is a rectangle. Here, the transversal direction of the case 2 is defined as the X-direction, the longitudinal direction of the case 2 is defined as the Y-direction, and the height direction of the case 2 is defined as the Z-direction. When the shape of the case 2 is a square, the length of the case 2 in the X-direction and the length of the case 2 in the Y-direction are the same.

The first to fourth electrode terminals 51 to 54 are attached to the bottom plate portion 21. The first electrode terminal 51 and the second electrode terminal 52 are positioned at two corners of the bottom plate portion 21 that face each other in the Y-direction, and the third electrode terminal 53 and the fourth electrode terminal 54 are positioned at two corners of the bottom plate portion 21 that face each other in the Y-direction. The first electrode terminal 51 and the third electrode terminal 53 face each other in the X-direction, and the second electrode terminal 52 and the fourth electrode terminal 54 face each other in the X-direction.

The shape of the core 3 is an oval (track shape) when seen in the axial direction. When seen in the axial direction, the core 3 includes a pair of longitudinal portions 31 that extend along the major axis and face each other in the minor-axis direction, and a pair of transversal portions 32 that extend along the minor axis and that face each other in the major-axis direction. The shape of the core 3 may be a rectangle or an ellipse when seen in the axial direction.

The core 3 is, for example, a ceramic core made of ferrite or the like, or a magnetic core made from an iron-based powder compact or a nanocrystal foil. The core 3 has a lower end surface 301 and an upper end surface 302 that face each other in the axial direction, an inner peripheral surface 303, and an outer peripheral surface 304. The lower end surface 301 faces an inner surface of the bottom plate portion 21. The upper end surface 302 faces an inner surface of the cover 22. The core 3 is accommodated in the case 2 so that the longitudinal direction of the core 3 coincides with the Y-direction.

The shape of a cross-section of the core 3 in a direction perpendicular to the circumferential direction is a rectangle. The lower end surface 301 and the upper end surface 302 are disposed perpendicular to the axial direction of the core 3. The inner peripheral surface 303 and the outer peripheral surface 304 are disposed parallel to the axial direction of the core 3. In the present specification, the term "perpendicular" refers not only to a state of being completely perpendicular but also to a state of being substantially perpendicular. The term "parallel" refers not only to a state of being completely parallel but also to a state of being substantially parallel.

The first coil 41 is wound around the core 3 between the first electrode terminal 51 and the second electrode terminal 52. One end of the first coil 41 is connected to the first electrode terminal 51. The other end of the first coil 41 is connected to the second electrode terminal 52.

The second coil 42 is wound around the core 3 between the third electrode terminal 53 and the fourth electrode terminal 54. One end of the second coil 42 is connected to the third electrode terminal 53. The other end of the second coil 42 is connected to the fourth electrode terminal 54.

The first coil 41 and the second coil 42 are wound along the major-axis direction so as to face each other in the minor-axis direction of the core 3. That is, the first coil 41 is wound around one of the longitudinal portions 31 of the core 3, and the second coil 42 is wound around the other longitudinal portion 31 of the core 3. The winding axis of the first coil 41 and the winding axis of the second coil 42 are parallel to each other. The first coil 41 and the second coil 42 are symmetric about the major axis of the core 3.

The number of turns of the first coil 41 and the number of turns of the second coil 42 are the same. The direction in which the first coil 41 is wound around the core 3 is opposite to the direction in which the second coil 42 is wound around the core 3. That is, the direction in which the first coil 41 is wound from the first electrode terminal 51 toward the second electrode terminal 52 is opposite to the direction in which the second coil 42 is wound from the third electrode terminal 53 toward the fourth electrode terminal 54.

The first to fourth electrode terminals 51 to 54 are connected so that common-mode currents flow in the first coil 41 from the first electrode terminal 51 toward the second electrode terminal 52 and flow in the second coil 42 from the third electrode terminal 53 toward the fourth electrode terminal 54, that is, the common-mode currents flow in the same direction. When a common-mode current flows in the first coil 41, a first magnetic flux due to the first coil 41 is generated in the core 3. When a common-mode current flows in the second coil 42, a second magnetic flux is generated in the core 3 in a direction such that the first magnetic flux and the second magnetic flux reinforce each other in the core 3. Therefore, a pair of the first coil 41 and the core 3 and a pair of the second coil 42 and the core 3 each serve as an inductance component, and noise is removed from the common-mode currents.

A plurality of pin members are connected to the first coil 41 by, for example, laser welding, spot welding, solder joint, or the like. The pin members are not a printed circuit board or conductive wires but are bar-shaped members. The pin members each have rigidity and are more resistant to bending than conductive wires that are used for connection between electronic component modules. To be specific, each pin member is resistant to bending for the following reasons: the length of the pin member is shorter than the length of a circumference of each of the lower end surface 301, the upper end surface 302, the inner peripheral surface 303, and the outer peripheral surface 304 of the core 3; and the rigidity of the pin member is high.

Figure 8:
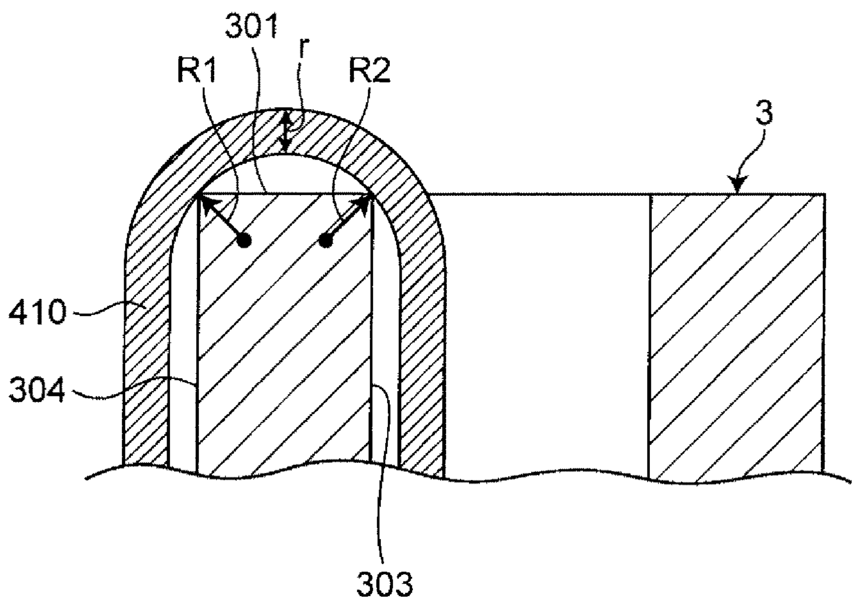
FIG. 8 illustrates a state in which a coil is wound around a core.

The pin members include: bent pin members 410, each of which is bent in a substantially U-shape; and first and second linear pin members 411 and 412, each of which extends in a substantially linear shape. The first coil 41 includes, in order from one end to the other end, a first linear pin member 411, a plurality of sets of bent pin members 410 and second linear pin members 412, and a first linear pin member 411. The length of the first linear pin member 411 and the length of the second linear pin member 412 are different. The spring index of the bent pin member 410 is as follows: when the bent pin member 410 is wound around the lower end surface 301, the inner peripheral surface 303, and the outer peripheral surface 304 of the core 3 as illustrated in FIG. 8, at the radius of curvature R1 of the bent pin member 410 positioned at a corner of the outer peripheral surface 304 of the core 3 and at the radius of curvature R2 of the bent pin member 410 positioned at a corner of the inner peripheral surface 303 of the core 3, the spring index Ks of the bent pin member 410 is smaller than 3.6. Thus, the bent pin member 410 has high rigidity and is resistant to bending.

The pin members 410 to 412 are each, for example, a polyamide-imide copper wire, and includes a copper wire and an insulation coating that covers the copper wire. The thickness of the insulation coating is, for example, 0.02 to 0.04 mm. The material of the insulation coating is a polyamide-imide resin.

The bent pin members 410 and the second linear pin members 412 are alternately connected to each other by, for example, laser welding, spot welding, solder joint, or the like. One end of a second linear pin member 412 is connected to one end of a bent pin member 410, and the other end of the second linear pin members 412 is connected to one end of another bent pin member 410. By repeating this, the bent pin members 410 and the second linear pin members 412 are connected, and the bent pin members 410 and the second linear pin members 412, which have been connected, are helically wound around the core 3. That is, a set of a bent pin member 410 and a second linear pin member 412 is a unit element for one turn.

The bent pin members 410 are parallelly arranged along each of the lower end surface 301, the inner peripheral surface 303, and the outer peripheral surface 304 of the core 3. The second linear pin members 412 are parallelly arranged along the upper end surface 302 of the core 3. The first linear pin members 411 are parallelly arranged along the outer peripheral surface 304 of the core 3.

The first electrode terminal 51 is connected to one of the first linear pin members 411, and the first linear pin member 411 is connected to one end of a bent pin member 410 that is adjacent to the first linear pin member 411. The second electrode terminal 52 is connected to the other first linear pin member 411, and the first linear pin member 411 is connected to one end of a second linear pin member 412 that is adjacent to the first linear pin member 411.

The second coil 42 is composed of a plurality of pin members, as with the first coil 41. That is, the second coil 42 includes, in order from one end to the other end, a first linear pin member 421, a plurality of sets of bent pin members 420 and second linear pin members 422, and a first linear pin member 421. The bent pin members 420 and the second linear pin members 422 are alternately connected to each other and wound around the core 3. That is, the bent pin members 420 and the second linear pin members 422 are connected, and the bent pin members 420 and second linear pin members 422, which are connected, are helically wound around the core 3.

The third electrode terminal 53 is connected to one of the first linear pin members 421, and the first linear pin member 421 is connected to one end of a bent pin member 420 that is adjacent to the first linear pin member 421. The fourth electrode terminal 54 is connected to the other first linear pin member 421, and the first linear pin member 421 is connected to one end of a second linear pin member 422 that is adjacent to the first linear pin member 421.

Figure 5:
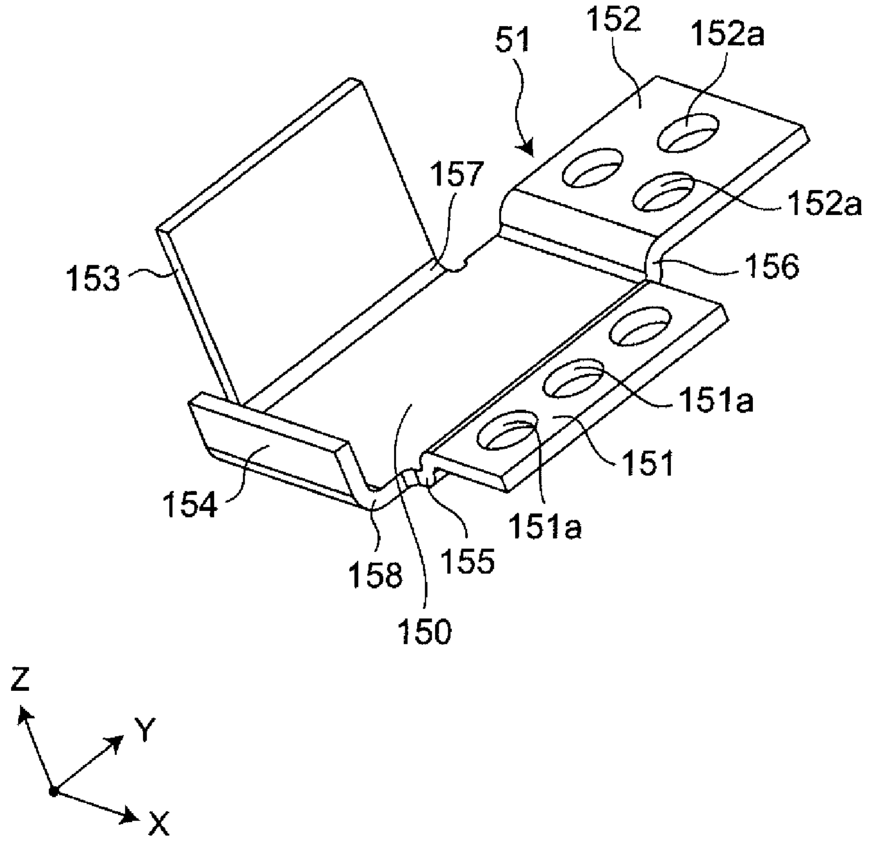
FIG. 5 is a perspective view of a first electrode terminal.

FIG. 5 is a perspective view of the first electrode terminal 51. Hereafter, the first electrode terminal 51 will be described. Descriptions of the second to fourth electrode terminals 52 to 54, which are similar to that of the first electrode terminal 51, will be omitted.

The first electrode terminal 51 includes a mounting surface portion 150, a first mold surface portion 151, a second mold surface portion 152, a connection surface portion 153, and a fillet surface portion 154. The first electrode terminal 51 is formed, for example, by punching and bending a metal plate.

The mounting surface portion 150 has a rectangular flat-plate shape along the XY-plane. The mounting surface portion 150 is formed so that the long sides thereof are parallel to the Y-direction and the short sides thereof are parallel to the X-direction.

The first and second mold surface portions 151 and 152 are connected to adjacent sides of the mounting surface portion 150 with boundary portions 155 and 156 therebetween. The first mold surface portion 151 is connected to a long side of the mounting surface portion 150 with the boundary portion 155 therebetween, and the second mold surface portion 152 is connected to a short side of the mounting surface portion 150 with the boundary portion 156 therebetween. The first and second mold surface portions 151 and 152 are disposed at positions higher than the mounting surface portion 150 in the Z-direction so as to be parallel to the mounting surface portion 150. The first and second mold surface portions 151 and 152 respectively have a plurality of holes 151*a* and a plurality of holes 152*a*. The first and second mold surface portions 151 and 152 each have a rectangular flat-plate shape along the XY-plane, and the boundary portions 155 and 156 each have a curved shape.

The connection surface portion 153 is connected to a long side of the mounting surface portion 150 with a boundary portion 157 therebetween. The connection surface portion 153 stands perpendicular to the mounting surface portion 150 in the Z-direction. The connection surface portion 153 has a rectangular flat-plate shape along the YZ-plane, and the boundary portion 157 has a curved shape.

The fillet surface portion 154 is connected to a short side of the mounting surface portion 150 with a boundary portion 158 therebetween. The fillet surface portion 154 stands perpendicular to the mounting surface portion 150 in the Z-direction. The fillet surface portion 154 has a rectangular flat-plate shape along the YZ-plane, and the boundary portion 158 has a curved shape.

Figure 6:
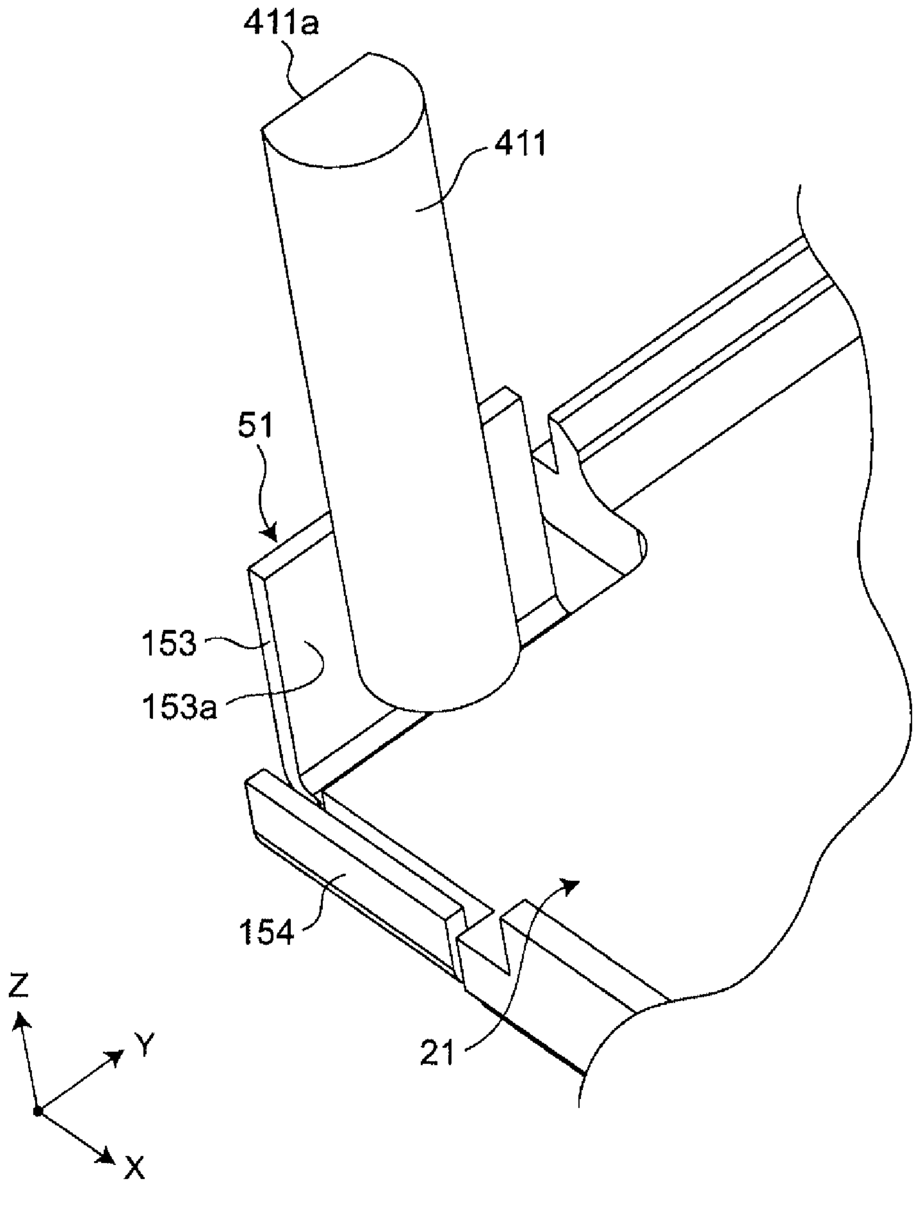
FIG. 6 is a perspective view illustrating a state in which the first electrode terminal is attached to a bottom plate.

FIG. 6 is a perspective view illustrating a state in which the first electrode terminal 51 is attached to the bottom plate portion 21. As illustrated in FIG. 6, the first electrode terminal 51 is attached to the bottom plate portion 21 of the case 2, and the first linear pin member 411 of the first coil 41 is attached to the first electrode terminal 51.

The connection surface portion 153 of the first electrode terminal 51 is exposed from the edge of the bottom plate portion 21. The first linear pin member 411 is connected to the connection surface portion 153. The first linear pin member 411 is connected so as to extend in the Z-direction. The first linear pin member 411 is disposed on the inner side of the connection surface portion 153 (the inner side of the case).

To be specific, the outer peripheral surface of the first linear pin member 411 (a part of the coil 41) includes a connection surface 411*a*. The connection surface 411*a* is a flat surface that extends along the axis of the first linear pin member 411. The connection surface 411*a* of the first linear pin member 411 is in surface-contact with a first main surface 153*a* on the inner side of the connection surface portion 153 in a state in which the connection surface 411*a* is positioned parallel to the first main surface 153*a*. That is, the connection surface 411*a* and the first main surface 153*a* are connected in a state in which these surfaces are in surface-contact with each other. The first main surface 153*a* and the outer peripheral surface 304 of the core 3 are parallel to each other. Thus, the first coil 41 is connected to the first electrode terminal 51. The connection surface 411*a* and the first main surface 153*a* are parallel to each other, and thus surface-contact of the connection surface 411*a* and the first main surface 153*a* is realized, and it is not necessary to wrap the first coil 41 around first electrode terminal 51. The first main surface 153*a* and the outer peripheral surface 304 of the core 3 are parallel to each other. Although the connection surface 411*a* is a flat surface, the connection surface 411*a* may have any shape, such as a curved shape, as long as the connection surface 411*a* can be in surface-contact with the first main surface 153*a* along the first main surface 153*a*, and the connection surface 411*a* and the first main surface 153*a* may be parallel to each other.

The fillet surface portion 154 of the first electrode terminal 51 is exposed from the edge of the bottom plate portion 21. The fillet surface portion 154 is a portion along which solder is to creep up. Accordingly, when mounting the inductor component 1 onto a mount substrate by using solder, the solder creeps up along the fillet surface portion 154, and it is possible to visually inspect the solder joint after being mounted and to increase the strength of solder connection. Preferably, the fillet surface portion 154 is plated with tin so as to have sufficient solder wettability.

Figure 7:
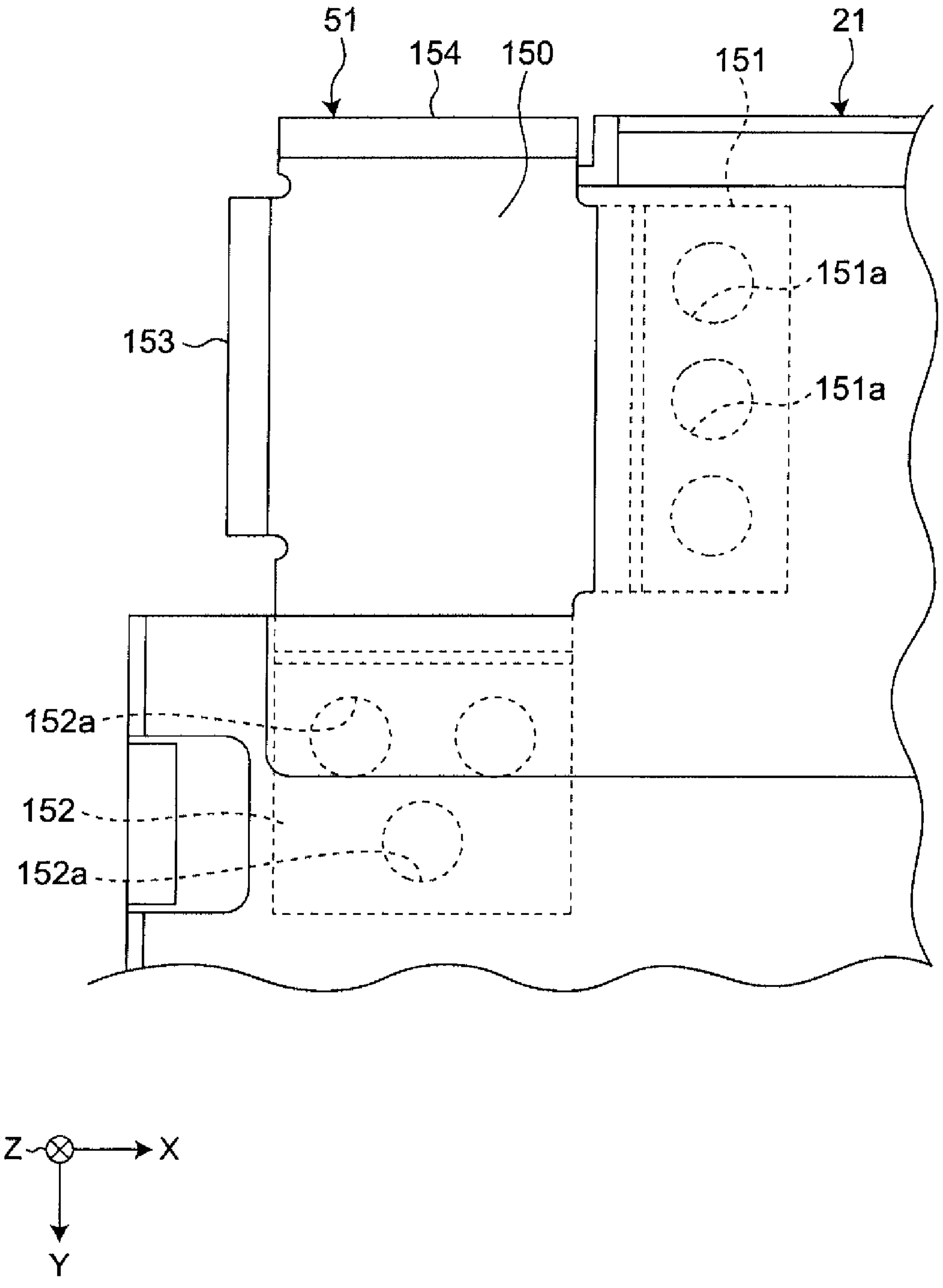
FIG. 7 is a bottom view illustrating a state in which the first electrode terminal is attached to a bottom plate.

FIG. 7 is a bottom view illustrating a state in which the first electrode terminal 51 is attached to the bottom plate portion 21. As illustrated in FIG. 7, the first electrode terminal 51 is attached to the bottom plate portion 21 of the case 2. The mounting surface portion 150 of the first electrode terminal 51 is exposed from the bottom surface of the bottom plate portion 21 and is a portion to be mounted on a mount substrate. The mounting surface portion 150 is connected to the mount substrate by, for example, reflow soldering. Preferably, the mounting surface portion 150 is plated with tin so as to have sufficient solder wettability.

The first and second mold surface portions 151 and 152 of the first electrode terminal 51 are portions to be integrated with the bottom plate portion 21 of the case 2. For example, the first and second mold surface portions 151 and 152 are embedded in the bottom plate portion 21 by being integrally molded. At this time, the material of the bottom plate portion 21 enters also into the holes 151*a* and 152*a*, and the first electrode terminal 51 is firmly fixed to the bottom plate portion 21. Accordingly, the first electrode terminal 51 is integrated with the bottom plate portion 21 of the case 2, and thus the inductor component 1 is resistant to vibration and impact load.

The second, third, and fourth electrode terminals 52, 53, and 54 are attached to the bottom plate portion 21 in the same manner as the first electrode terminal 51; and the second, third, and fourth electrode terminals 52, 53, and 54 are attached to the first linear pin members 411 and 421 in the same manner as the first electrode terminal 51. Therefore, descriptions of these will be omitted.

With the inductor component 1, the connection surfaces 411*a* of the coils 41 and 42 are connected to the first main surfaces 153*a* of the connection surface portions 153 of the electrode terminals 51 to 54 so as to be positioned parallel to and to be in surface-contact with the first main surfaces 153*a*, and thus the coils 41 and 42 are not connected to the electrode terminals 51 to 54 by wrapping the coils 41 and 42 around the electrode terminals 51 to 54.

Accordingly, deformation of the electrode terminals 51 to 54 due to an operation of wrapping the coils 41 and 42 or due to residual stress in the wrapped coils 41 and 42 can be prevented. Thus, thick coils 41 and 42 can be connected to thin electrode terminals 51 to 54, and electrode terminals 51 to 54 that can be easily bent and coils 41 and 42 that can pass a large electric current can be used. Moreover, because the coils 41 and 42 are not wrapped around the electrode terminals 51 to 54, swelling of the coils 41 and 42 due to bending does not occur, thus a gap is not likely to be formed between the coils 41 and 42 and the electrode terminals 51 to 54, and connection stability and reduction in size can be realized.

To be specific, a coil that need to pass a large electric current has a larger wire diameter and the strength of the coil increases. Then, a load needed to bend the coil increases. The strength and the load can be calculated from the second moment of area and the section modulus, and, when the wire diameter increases by twice, the second moment of area increases by 8 times, and the section modulus increases by 16 times. Thus, for example, when wrapping a coil having a wire diameter of 0.6 mm around an electrode terminal having a thickness of 0.3 mm, the ratio of the strength of the coil to the strength of the electrode terminal is approximately 8, and the electrode terminal may deform. However, with the structure according to the present disclosure, which does not require an operation of wrapping the coil around the electrode terminal, the electrode terminal does not deform. To be specific, this is a structure in which a first linear pin member having a wire diameter of 1.0 mm to 2.0 mm is connected to an electrode terminal having a thickness of 0.3 mm, and the structure can pass a large electric current.

Moreover, when a thick-wire coil is wrapped around an electrode terminal, swelling of the coil due to bending occurs, a gap is generated between the electrode terminal and the coil, and it becomes difficult to perform connection and joining. This occurs due to increase in the strength of the coil as described above. These relationships can be presented by "spring index". Here, the spring index of a bent pin member of a coil will be described. FIG. 8 illustrates a state in which the bent pin member 410 is wound around the core 3. As illustrated in FIG. 8, the spring index Ks=(radius of curvature R1 or R2 of bent pin member)/(wire diameter r of bent pin member). The "radius of curvature R1" is a radius of curvature positioned at a corner of the outer peripheral surface of the core 3, and the "radius of curvature R2" is a radius of curvature positioned at a corner of the inner peripheral surface of the core 3. The spring index Ks of the bent pin member 410 is smaller than 3.6 at either of the radii of curvatures R1 and R2. On the other hand, it is known by experiment that the spring index is larger than or equal to 3.6 with an ordinary winding method of manually winding a conductive wire around a core. Accordingly, swelling of a coil, having a wire diameter of 1.0 mm, due to bending is ((Ks×1.0)−1.0)/2. Even when Ks=3.6, which is small, swelling of the coil due to bending is 1.3 mm With such a structure, because bending of the coil is not performed, connection stability and reduction in size can be realized.

Figure 9:
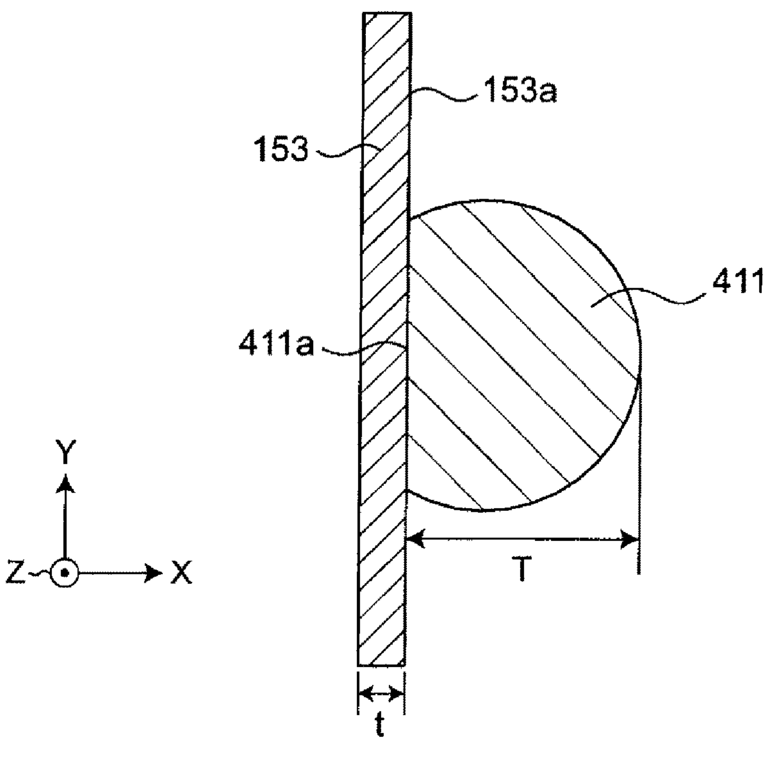
FIG. 9 is an XY-sectional view of a connection portion where a first linear pin member and a first electrode terminal are connected.

FIG. 9 is an XY-sectional view of a connection portion where the first linear pin member 411 and the first electrode terminal 51 are connected. In the connection portion where the first linear pin member 411 and the connection surface portion 153 are connected, the thickness T of the first linear pin member 411 is, preferably, is larger than or equal to twice and smaller than or equal to twenty times (i.e., from twice to twenty times) the thickness t of the connection surface portion 153. The thickness T of the first linear pin member 411 is the thickness of the first linear pin ember 411 in the connection portion, that is, the largest distance from the connection surface portion 153 in the X-direction.

In this case, because the thickness T of the first linear pin member 411 is larger than or equal to twice the thickness t of the connection surface portion 153, the coil 41 (the first linear pin member 411) can be made thick, a coil that can pass a large electric current can be used, the electrode terminal 51 can be made thin, and an electrode terminal 51 that can easily bent can be used.

Because the thickness T of the first linear pin member 411 is smaller than twenty times the thickness t of the connection surface portion 153, the relative strength of the connection surface portion 153 relative to the first linear pin member 411 can be made sufficient, and the connection surface portion 153 can retain the first linear pin member 411.

Next, an example of the second moment of area of each of the first linear pin member 411 and the electrode terminal 51 (the connection surface portion 153) will be described. Here, the thickness of the first linear pin member 411 is defined as the diameter of the first linear pin member 411. The cross-sectional area of the first linear pin member 411 is the area of a circle whose diameter is equal to the diameter of the first linear pin member 411. The width of the electrode terminal 51 (the connection surface portion 153) is defined as the size in the Y-direction. The cross-sectional area of the electrode terminal 51 (the connection surface portion 153) is the product of the width and the thickness of the connection surface portion 153. The ratio is the proportion of the first linear pin member 411 to the electrode terminal 51 (first linear pin member/electrode terminal).

In a usual case, the thickness (diameter) of the first linear pin member 411 is 2 mm, and the width of the connection surface portion 153 is 0.3 mm Table 1 shows the ratio of the second moment of area in this case. The second moment of area of the electrode terminal 51 is 0.00563 $mm^4$, the second moment of area of the first linear pin member 411 is 0.785 $mm^4$, and the ratio is 139.6.

TABLE 1

| | Unit | Electrode Terminal | Pin Member | Ratio |
|---|---|---|---|---|
| Thickness | [mm] | 0.3 | 2 | |
| Width | [mm] | 2.5 | | |
| Cross-Sectional Area | [$mm^2$] | 0.8 | 3.1 | 4.2 |
| Second Moment of Area | [$mm^4$] | 0.00563 | 0.785 | 139.6 |

In a case where the first linear pin member 411 is thick and the width of the connection surface portion 153 is small, the thickness (diameter) of the first linear pin member 411 is 2 mm at the maximum, and the width of the connection surface portion 153 is 0.1 mm at the minimum. Table 2 shows the second moment of area in this case. The second moment of area of the electrode terminal 51 is 0.00021 $mm^4$, the second moment of area of the first linear pin member 411 is 0.785 $mm^4$, and the ratio is 3769.9.

TABLE 2

| | Unit | Electrode Terminal | Pin Member | Ratio |
|---|---|---|---|---|
| Thickness | [mm] | 0.1 | 2 | |
| Width | [mm] | 2.5 | | |
| Cross-Sectional Area | [$mm^2$] | 0.3 | 3.1 | 12.6 |
| Second Moment of Area | [$mm^4$] | 0.00021 | 0.785 | 3769.9 |

In a case where the first linear pin member 411 is slightly thick and the width of the connection surface portion 153 is large, the thickness (diameter) of the first linear pin member 411 is 1 mm at the minimum, and the width of the connection surface portion 153 is 0.3 mm at the maximum. Table 3 shows the second moment of area in this case. The second moment of area of the electrode terminal 51 is 0.00563 $mm^4$, the second moment of area of the first linear pin member 411 is 0.049 $mm^4$, and the ratio is 8.7.

TABLE 3

| | Unit | Electrode Terminal | Pin Member | Ratio |
|---|---|---|---|---|
| Thickness | [mm] | 0.3 | 1 | |
| Width | [mm] | 2.5 | | |
| Cross-Sectional Area | [$mm^2$] | 0.8 | 0.8 | 1.0 |
| Second Moment of Area | [$mm^4$] | 0.00563 | 0.049 | 8.7 |

It can be seen from Tables 1, 2, and 3 that with the structure according to the present embodiment, because a wrapping operation is not performed, even when the ratio of the second moment of area of the first linear pin member 411 to the second moment of area of the electrode terminal 51 (the connection surface portion 153) is in the range of 8.7 to 3769.9, the first linear pin member 411 and the electrode terminal 51 can be sufficiently connected to each other. Thus, the coil 41 (the first linear pin member 411) can be made thicker, a coil that can pass a large electric current can be used, the electrode terminal 51 can be made thinner, and an electrode terminal 51 that can be easily bent can be used.

Figure 10:
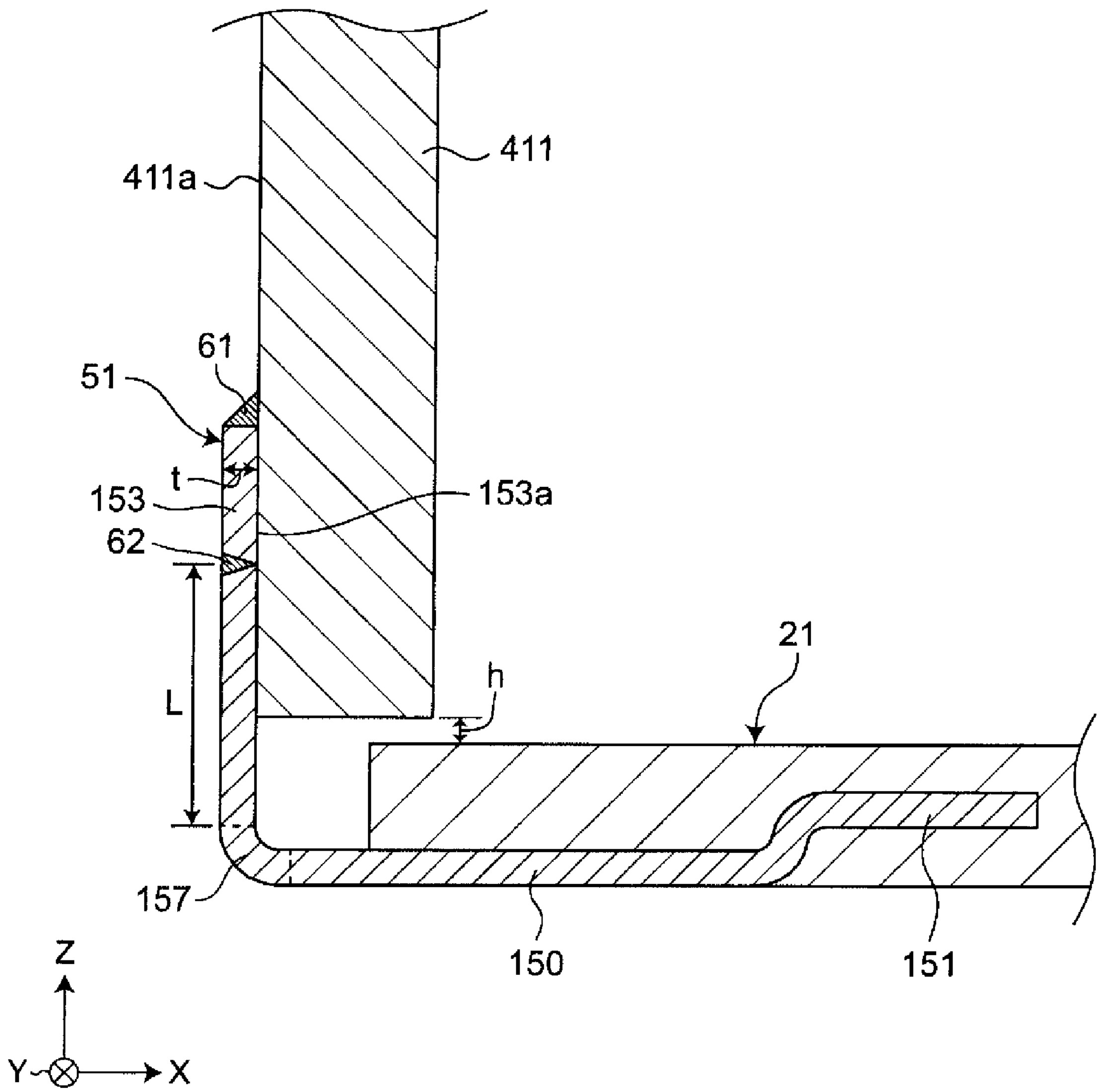
FIG. 10 is a ZX-sectional view illustrating a state in which the first linear pin member and the first electrode terminal are connected.

FIG. 10 is a sectional view illustrating a state in which the first linear pin member 411 and the first electrode terminal 51 are connected. As illustrated in FIG. 10, the first linear pin member 411 is welded to the connection surface portion 153 of the first electrode terminal 51 by laser welding. Thus, crack is more unlikely to occur compared with soldering or adhesive bonding, and the connection strength can be increased. The first linear pin member 411 is welded to the connection surface portion 153 different from the mounting surface portion 150, and thus transfer of heat, which is generated during welding, to the mounting surface portion 150 can be reduced.

The first linear pin member 411 is welded to at least the edge of the connection surface portion 153. The edge of the connection surface portion 153 is positioned in the Z-direction of the connection surface portion 153. Thus, not only the edge of the connection surface portion 153 but also the first linear pin member 411 can be sufficiently fused and joined to each other, and the connection strength can be increased.

To be specific, the welded portion where the first linear pin member 411 and the connection surface portion 153 are welded to each other includes a first welded portion 61 and a second welded portion 62. The first welded portion 61 is positioned at the edge of the connection surface portion 153. The second welded portion 62 is positioned at a middle part of the connection surface portion 153 in the Z-direction.

The shortest distance L between the welded portions 61 and 62 where the first linear pin member 411 and the connection surface portion 153 are welded to each other and the boundary portion 157 between the mounting surface portion 150 and the connection surface portion 153 is, preferably, larger than or equal to twice and smaller than or equal to thirty times (i.e., from twice to thirty times) the thickness t of the connection surface portion 153. That is, the shortest distance L is the distance between the second welded portion 62 and the boundary portion 157.

Thus, the shortest distance L is larger than or equal to twice the thickness t of the connection surface portion 153, and thus transfer of heat, which is generated during welding, to the mounting surface portion 150 can be reduced. Thus, in a case where the mounting surface portion 150 is plated with tin beforehand in order to improve the wettability of solder and then the coil is welded to the connection surface portion 153, the influence of heat during welding on tin plating can be reduced, and the wettability of solder on the mounting surface portion 150 can be maintained.

Because the shortest distance L is smaller than or equal to thirty times the thickness t of the connection surface portion 153, the area of contact between the first linear pin member 411 and the connection surface portion 153 can be sufficiently provided. Thus, the first linear pin member 411 can be reliably welded to the connection surface portion 153 and the strength of welding can be maintained, and increase of direct current resistance can be suppressed.

The height h of the first linear pin member 411 from the bottom plate portion 21 is preferably 0 mm or larger and 0.7 mm or smaller (i.e., from 0 mm to 0.7 mm), and more preferably 0.2 mm. This is related to the welded portion, and if the height h is larger than 0.7 mm, welding cannot be performed, the joint strength decreases, and the direct current resistance increases.

As illustrated in FIG. 7, the ratio of the area of the holes 151*a* and 152*a* to the area of the first and second mold surface portions 151 and 152 is preferably 20% or higher and 50% or lower. Thus, while maintaining the strength of the first and second mold surface portions 151 and 152, the strength of connection between the first and second mold surface portions 151 and 152 and the bottom plate portion 21 can be sufficiently obtained. Table 4 shows an example of the area ratio.

TABLE 4

| | First Mold Surface Portion | Second Mold Surface Portion |
|---|---|---|
| Width [mm] | 1.8 | 3.7 |
| Length [mm] | 4.8 | 3.1 |
| Area [mm$^2$] | 8.64 | 11.47 |
| Widthwise Smallest Thickness [mm] | 0.40 | 0.57 |
| Lengthwise Smallest Thickness [mm] | 0.45 | 0.40 |
| Hole size [mm] | 1 | 1 |
| Number | 3 | 3 |
| Total Hole Area [mm$^2$] | 2.36 | 2.36 |
| Area Ratio | 27% | 21% |

The term "width" refers to a dimension in the X-direction, the term "length" refers to a dimension in the Y-direction, and the term "area" is calculated as the product of the width and the length. The term "widthwise smallest thickness" refers to the thickness of a thinnest portion in the width direction, and the term "lengthwise smallest thickness" refers to the thickness of a thinnest portion in the length direction. The term "hole size" refers to the diameter of each of the holes 151*a* and 152*a*, and the term "number" refers to the number of each of the holes 151*a* and 152*a*, and the term "total hole area" is calculated as the product of the area of a circle, which is calculated from the hole size, and the number. The term "area ratio" refers to the ratio of "total hole area" to "area". As shown in Table 4, the area ratio of the first mold surface portion 151 is 27% and the area ratio of the second mold surface portion 152 is 21%, each of which is 20% or higher and 50% or smaller (i.e., from 20% to 50%). Thus, the strength of the first and second mold surface portions 151 and 152 can be maintained sufficiently high.

Moreover, in the first and second mold surface portions 151 and 152, preferably, small thickness portions are substantially eliminated, and the area is increased so that support can be performed the entire surface can be supported. To be specific, when the sum of the areas of the first and second mold surface portions 151 and 152 is larger than the area of the mounting surface portion 150, the entire surfaces can be supported. When the sum of the areas of the first and second mold surface portions 151 and 152 is smaller than twice the area of the mounting surface portion 150, short-circuit between the electrode terminals can be prevented. Preferably, the size of the holes 151*a* and 152*a* is increased in order to obtain strength, and the holes 151*a* and 152*a* are disposed in a wide area so that the first electrode terminal 51 can be supported at the entire surface. To be specific, preferably, the holes 151*a* and 152*a* are disposed so as to be distributed in a wide area of the first and second mold surface portions 151 and 152. By disposing the holes 151*a* and 152*a* in a wide area, bending stress of the first and second mold surface portions 151 and 152 can be increased.

Method of Manufacturing Inductor Component

Next, a method of manufacturing the inductor component 1 will be described.

Figure 11:
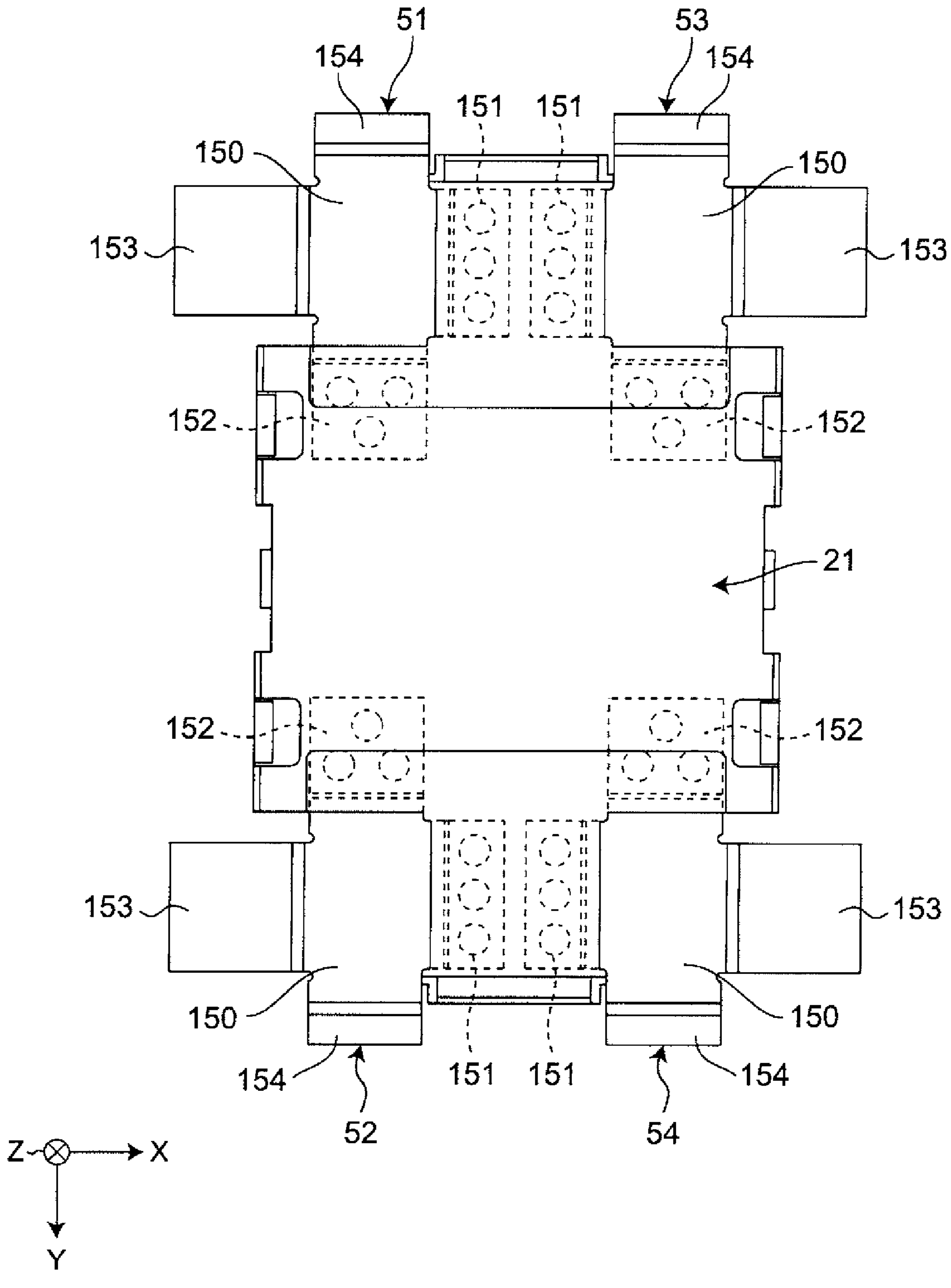
FIG. 11 illustrates a method of manufacturing an inductor component according to an embodiment of the present disclosure.

As illustrated in FIG. 11, the first to fourth electrode terminals 51 to 54 are attached to the bottom plate portion 21 by integral molding. To be specific, the first and second mold surface portions 151 and 152 of the first to fourth electrode terminals 51 to 54 are embedded in the bottom plate portion 21, and thus the first to fourth electrode terminals 51 to 54 are attached to the bottom plate portion 21. At this time, at each of the first to fourth electrode terminals 51 to 54, the mounting surface portion 150, the connection surface portion 153, and the fillet surface portion 154 are in a state of being developed on an identical plane.

Figure 12:
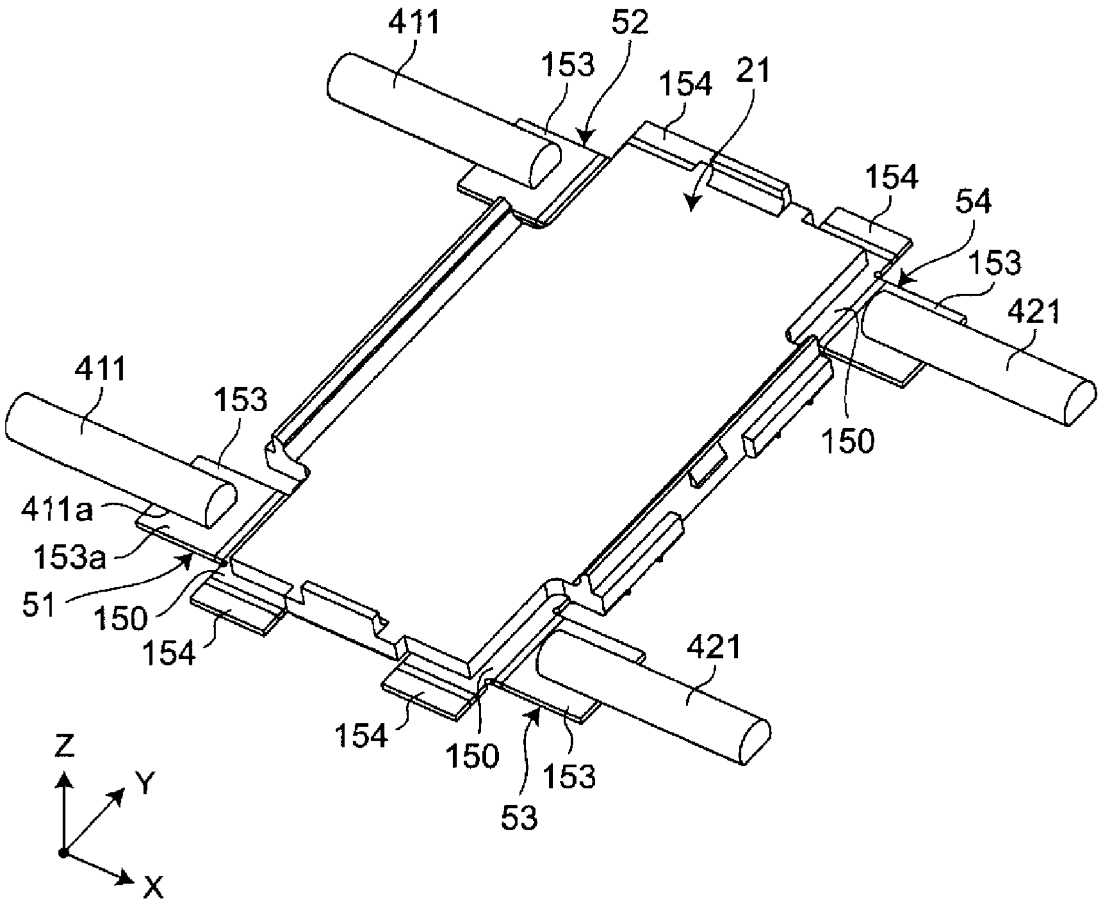
FIG. 12 illustrates the method of manufacturing an inductor component according to an embodiment of the present disclosure.

Subsequently, as illustrated in FIG. 12, at the first electrode terminal 51, in a state in which the mounting surface portion 150, the connection surface portion 153, and the fillet surface portion 154 are developed on an identical plane, the connection surface 411*a* of the first linear pin member 411 is brought into surface-contact with the first main surface 153*a* of the connection surface portion 153 and is welded to the first main surface 153*a* in a state in which the connection surface 411*a* is positioned parallel to the first main surface 153*a*. At this time, welding is performed by emitting a laser beam from the second main surface on the opposite side from the first main surface 153*a* (in the Z-direction). The same applies to welding of the second electrode terminal 52 and the first linear pin member 411, welding of the third electrode terminal 53 and the first linear pin member 421, and welding of the fourth electrode terminal 54 and the first linear pin member 421.

Figure 13:
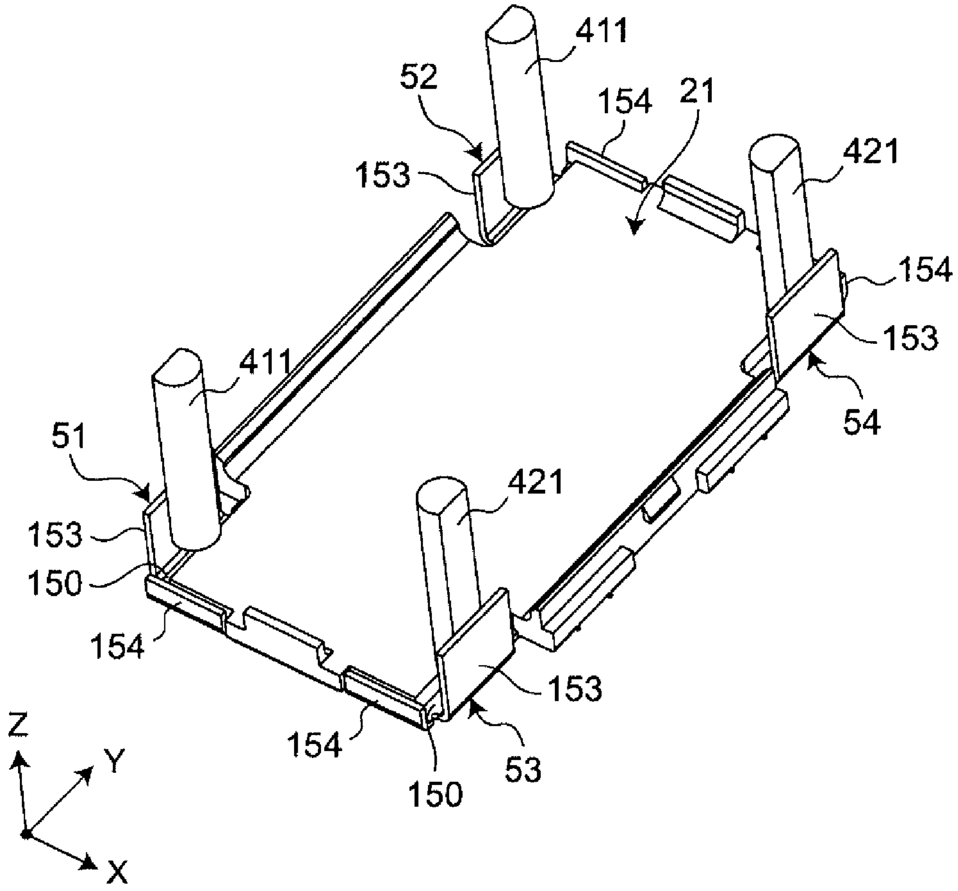
FIG. 13 illustrates the method of manufacturing an inductor component according to an embodiment of the present disclosure.

Subsequently, as illustrated in FIG. 13, at the first electrode terminal 51, the connection surface portion 153 is bent relative to the mounting surface portion 150 and the connection surface portion 153 is caused to stand perpendicular to the mounting surface portion 150. Moreover, the fillet surface portion 154 is bent relative to the mounting surface portion 150, and thus the fillet surface portion 154 is caused to stand perpendicular to the mounting surface portion 150. The same applies to the second to fourth electrode terminals 52 to 54.

Subsequently, as illustrated in FIG. 4, a step of assembling the core 3 and the coils 41 and 42, and a step of accommodating the core 3 and the coils 41 and 42 into the case 2 are performed, and thus the inductor component 1 is manufactured.

With the method of manufacturing the inductor component 1, the connection surfaces 411*a* of the pin members 411 and 421 are welded to the first main surfaces 153*a* of the connection surface portions 153 of the electrode terminals 51 to 54 so as to be positioned parallel to and to be in surface-contact with the first main surfaces 153*a*, and thus the coils 41 and 42 are not connected to the electrode terminals 51 to 54 by wrapping the coils 41 and 42 around the electrode terminals 51 to 54.

Accordingly, deformation of the electrode terminals 51 to 54 due to an operation of wrapping the coils 41 and 42 or due to residual stress in the wrapped coils 41 and 42 can be prevented. Thus, thick coils 41 and 42 can be connected to thin electrode terminals 51 to 54, and electrode terminals 51 to 54 that can be easily bent and coils 41 and 42 that can pass a large electric current can be used. Moreover, because the coils 41 and 42 are not wrapped around the electrode terminals 51 to 54, swelling of the coils 41 and 42 due to bending does not occur, thus a gap is not likely to be formed between the coils 41 and 42 and the electrode terminals 51 to 54, and connection stability and reduction in size can be realized.

Moreover, after welding each of the pin members 411 and 421 to the connection surface portion 153 in a state in which the mounting surface portion 150 and the connection surface portion 153 are developed, the connection surface portion 153 is bent relative to the mounting surface portion 150 and the connection surface portion 153 is caused to stand with respect to the mounting surface portion 150, and thus the welding operation can be easily performed, compared with a case where the pin members 411 and 421 are welded to the connection surface portion 153 in a state in which the connection surface portion 153 has been caused to stand on the mounting surface portion 150.

In particular, as illustrated in FIG. 12, when welding the pin members 411 and 421 to each of the electrode terminals 51 to 54, the electrode terminals 51 to 54 are arranged on an identical plane (XY plane) in a developed state, and the pin members 411 and 421 can be welded to the electrode terminals 51 to 54, so that the welding operation can be performed on an identical plane and can be performed easily.

The present disclosure is not limited to the embodiment described above, and may be modified within the spirit and scope of the present disclosure. For example, the shape of the case and the shape of the electrode terminal are not limited to those in the present embodiment, and may be modified. The number of coils and the number of electrode terminals are not limited to those in the embodiment described above, and may be changed.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a case;

an annular core that is accommodated in the case;

a coil that is wound around the core; and an electrode terminal that is attached to the case and connected to the coil, wherein the electrode terminal includes a mounting surface portion that is disposed along an end surface of the core and that is configured to mount on a mount substrate, and a connection surface portion that is perpendicularly connected to the mounting surface portion and that is disposed along an outer peripheral surface of the core, wherein the coil includes a plurality of pin members including a first linear pin member, an exterior surface of the first linear pin that faces away from the core is flat and an interior surface of the first linear pin that faces toward the core is circular, and a connection surface that is a part of an outer peripheral surface of the first linear pin member is in surface-contact with a first main surface of the connection surface portion in a state in which the connection surface is positioned parallel to the first main surface.

2. The inductor component according to claim 1, wherein the electrode terminal includes a mold surface portion that is connected to the mounting surface portion and embedded in the case.

3. The inductor component according to claim 1, wherein the electrode terminal includes a fillet surface portion that is perpendicularly connected to the mounting surface portion and along which solder is to creep up.

4. The inductor component according to claim 1, wherein in a connection portion where the coil and the electrode terminal are connected to each other, a thickness of the coil is larger than or equal to twice a thickness of the connection surface portion.

5. The inductor component according to claim 1, wherein the coil is welded to the connection surface portion of the electrode terminal.

6. The inductor component according to claim 5, wherein the coil is at least welded to an edge of the connection surface portion.

7. The inductor component according to claim 5, wherein a shortest distance between a welded portion where the coil and the electrode terminal are welded to each other, and a boundary portion between the mounting surface portion and the connection surface portion is larger than or equal to twice a thickness of the connection surface portion.

8. The inductor component according to claim 2, wherein the electrode terminal includes a fillet surface portion that is perpendicularly connected to the mounting surface portion and along which solder is to creep up.

9. The inductor component according to claim 2, wherein in a connection portion where the coil and the electrode terminal are connected to each other, a thickness of the coil is larger than or equal to twice a thickness of the connection surface portion.

10. The inductor component according to claim 3, wherein in a connection portion where the coil and the electrode terminal are connected to each other, a thickness of the coil is larger than or equal to twice a thickness of the connection surface portion.

11. The inductor component according to claim 8, wherein in a connection portion where the coil and the electrode terminal are connected to each other, a thickness of the coil is larger than or equal to twice a thickness of the connection surface portion.

12. The inductor component according to claim 2, wherein the coil is welded to the connection surface portion of the electrode terminal.

13. The inductor component according to claim 3, wherein the coil is welded to the connection surface portion of the electrode terminal.

14. The inductor component according to claim 4, wherein the coil is welded to the connection surface portion of the electrode terminal.

15. The inductor component according to claim 6, wherein a shortest distance between a welded portion where the coil and the electrode terminal are welded to each other, and a boundary portion between the mounting surface portion and the connection surface portion is larger than or equal to twice a thickness of the connection surface portion.

16. The inductor component according to claim 1, wherein the exterior surface of the first linear pin that faces away from the core is flat along an entire length of the exterior surface of the first linear pin.

17. The inductor component according to claim 1, wherein the first linear pin is positioned within the case.

18. The inductor component according to claim 1, wherein the coil includes a second linear pin, and the first linear pin directly contacts and is connected to the second linear pin.

19. A method of manufacturing an inductor component that includes an annular core, a coil that is wound around the core and includes a plurality of pin members that are connected and include a first linear pin member, an exterior surface of the first linear pin that faces away from the core is flat and an interior surface of the first linear pin that faces toward the core is circular, and an electrode terminal including a mounting surface portion and a connection surface portion that is connected to the mounting surface portion, the method comprising:

bringing, in a state in which the mounting surface portion and the connection surface portion are developed on an identical plane, a connection surface of an outer peripheral surface of the first linear pin member into surface-contact with a first main surface of the connection surface portion, the connection surface of the outer peripheral surface of the first linear pin being one of the flat exterior surface and the circular interior surface, and welding the connection surface to the first main surface in a state in which the connection surface is positioned parallel to the first main surface; and bending the connection surface portion relative to the mounting surface portion and causing the connection surface portion to stand perpendicular to the mounting surface portion.

* * * * *